July 2, 1940. C. T. NEAL 2,206,727
CONTROL MECHANISM FOR LIQUID DISPENSING APPARATUS
Filed Nov. 9, 1936 5 Sheets-Sheet 1

INVENTOR
BY CHESTER T. NEAL
Chapin & Neal
ATTORNEYS

July 2, 1940. C. T. NEAL 2,206,727
CONTROL MECHANISM FOR LIQUID DISPENSING APPARATUS
Filed Nov. 9, 1936 5 Sheets-Sheet 2
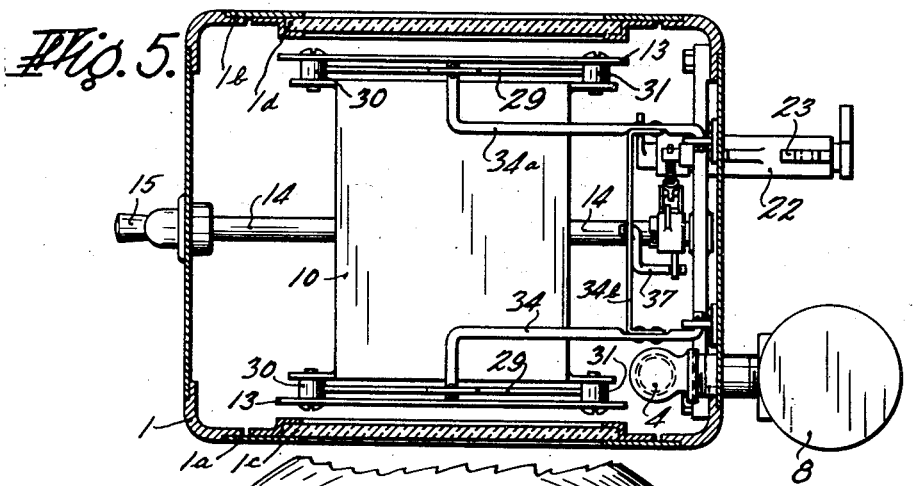
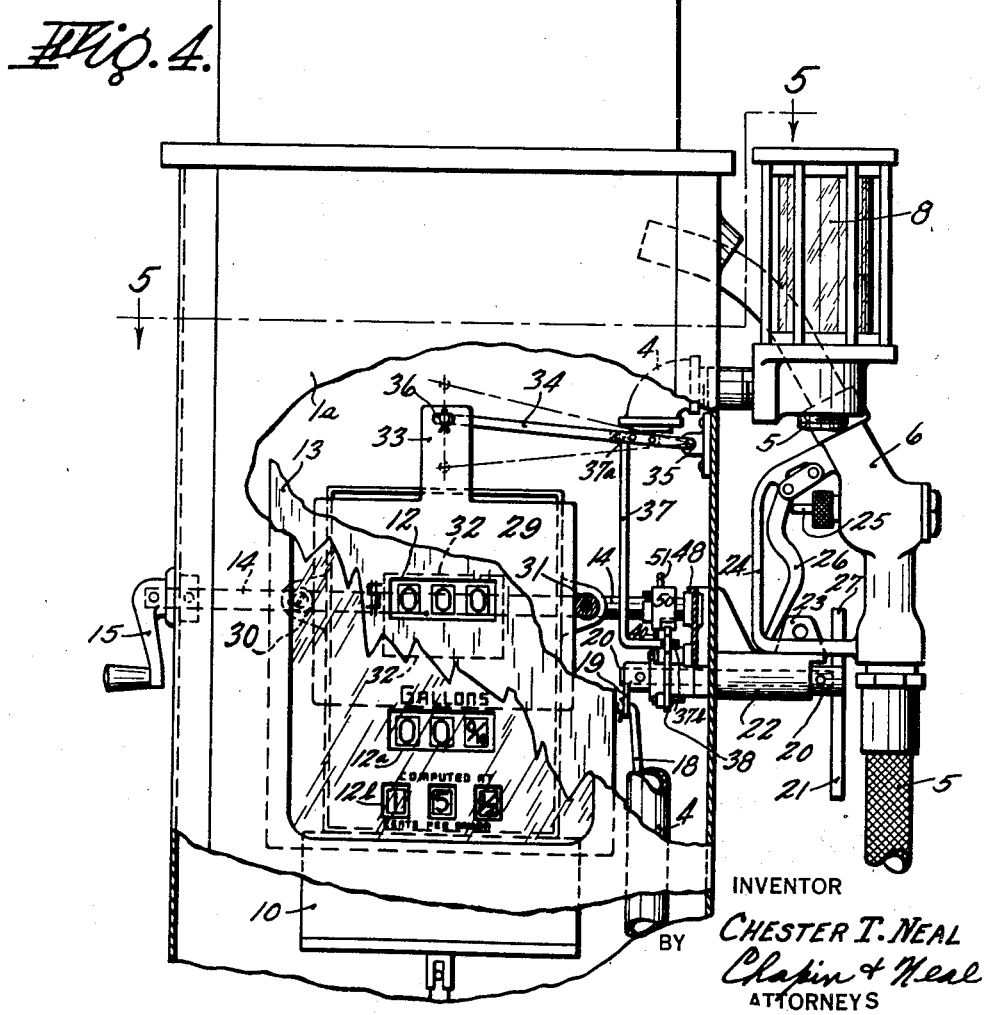
INVENTOR
CHESTER T. NEAL
BY Chapin & Neal
ATTORNEYS July 2, 1940.　　　　　C. T. NEAL　　　　　2,206,727
CONTROL MECHANISM FOR LIQUID DISPENSING APPARATUS
Filed Nov. 9, 1936　　　5 Sheets-Sheet 3
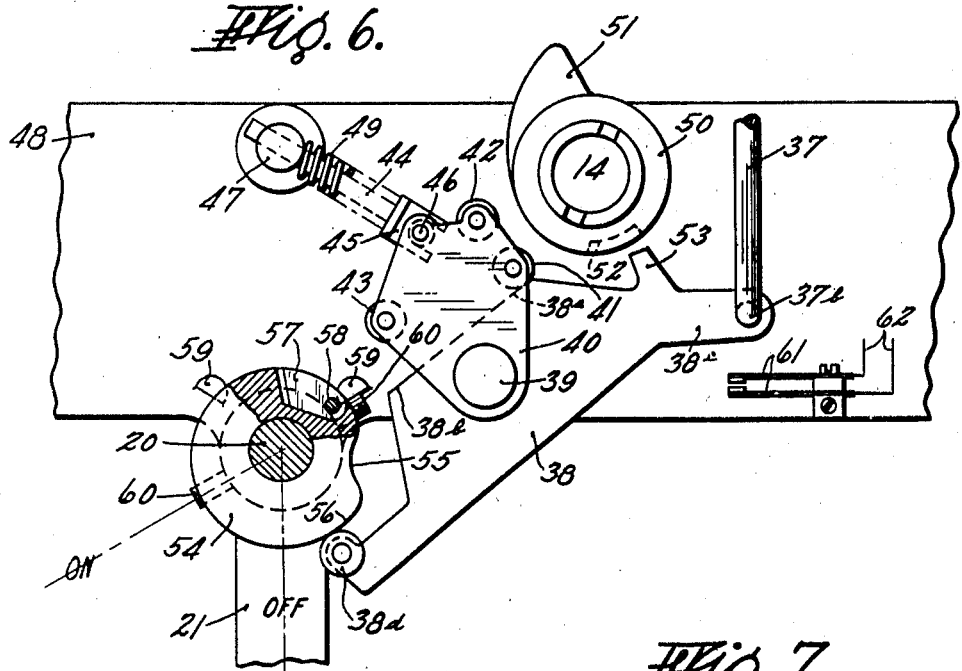
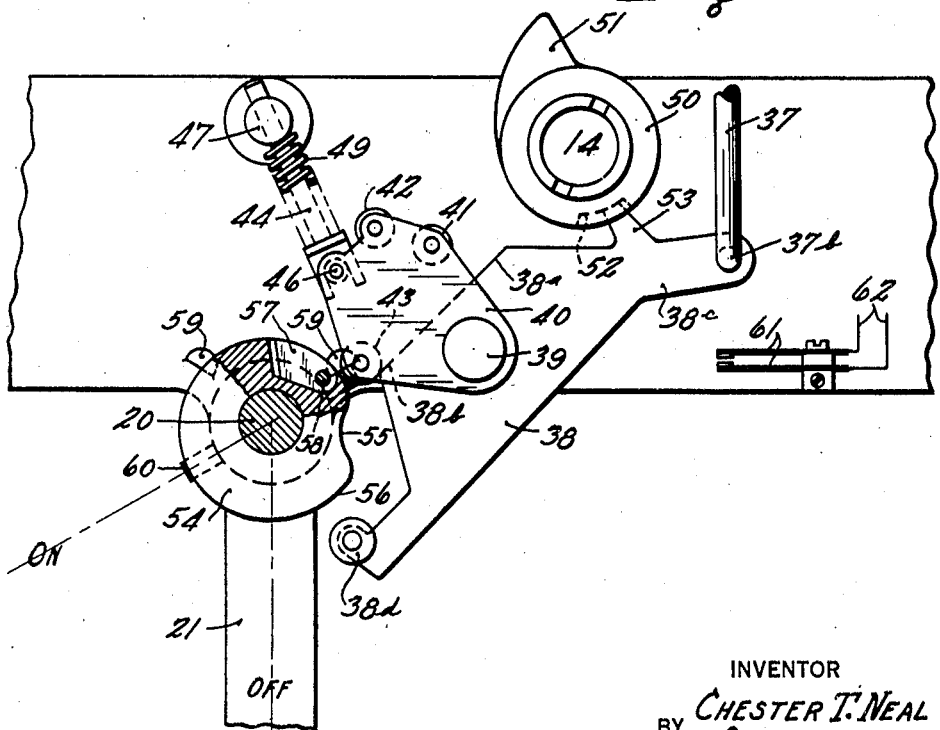
INVENTOR
CHESTER T. NEAL
BY Chapin + Neal
ATTORNEYS July 2, 1940.　　　　C. T. NEAL　　　　2,206,727
CONTROL MECHANISM FOR LIQUID DISPENSING APPARATUS
Filed Nov. 9, 1936　　　5 Sheets-Sheet 4
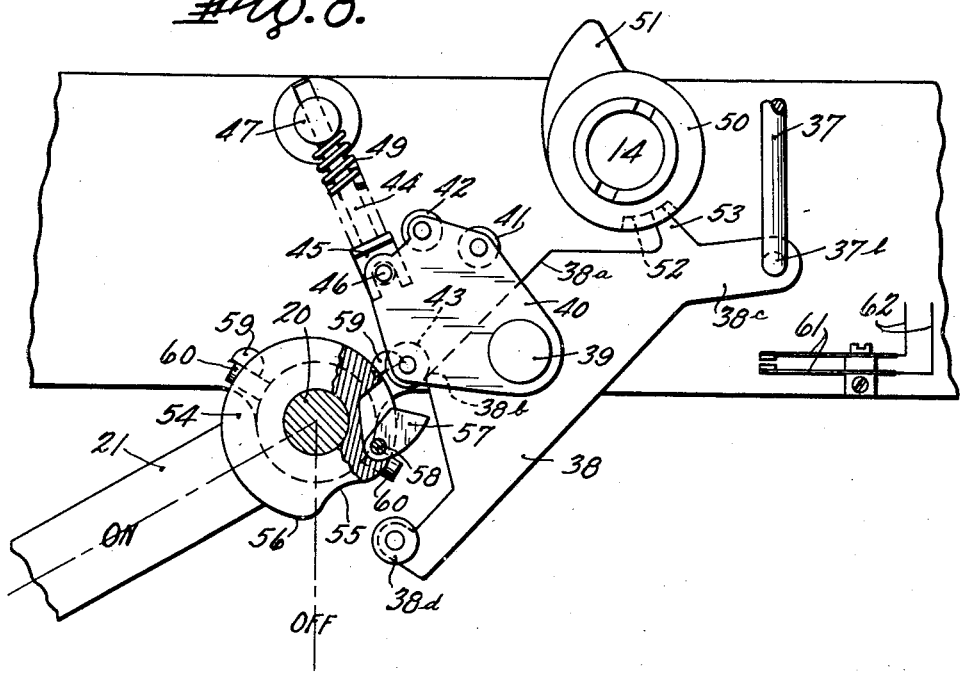
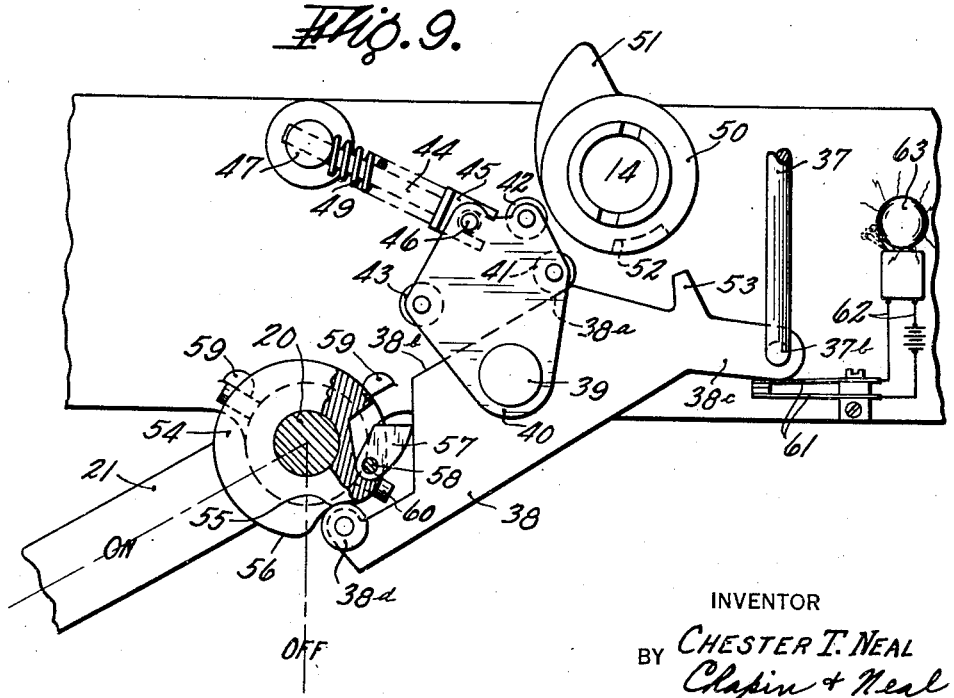
INVENTOR
BY CHESTER T. NEAL
Chapin & Neal
ATTORNEYS

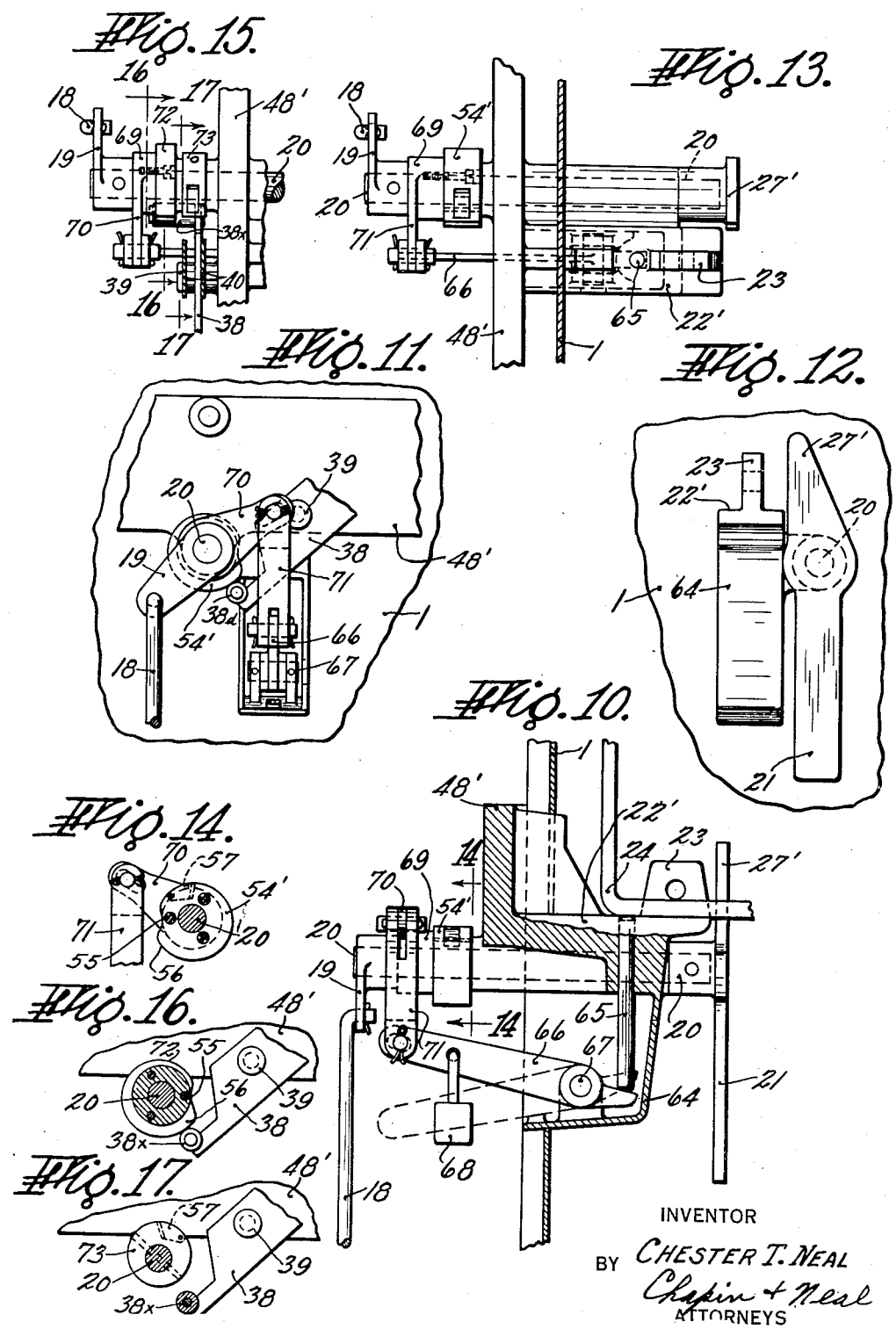

Patented July 2, 1940

2,206,727

UNITED STATES PATENT OFFICE 2,206,727

CONTROL MECHANISM FOR LIQUID DISPENSING APPARATUS

Chester T. Neal, Springfield, Mass., assignor to Gilbert & Barker Manufacturing Company, West Springfield, Mass., a corporation of Massachusetts Application November 9, 1936, Serial No. 109,836

30 Claims. (Cl. 221—95)

This invention relates to an improved control mechanism for liquid dispensing apparatus of the meter register type such as are in common use today for supplying gasoline to automobiles.

The usual apparatus of this type comprises an electric motor driven pump forcing the liquid gasoline through a meter for measuring the flow and eventually discharging the same through a flexible hose and delivery nozzle into the automobile of a purchaser. A register indicator is coupled to the meter and furnishes a progressive and visible record of the amount of the gasoline being dispensed. In some of the more recent forms, such indicators are of the so-called computing type which indicate the dispensed amount of gasoline both in terms of gallons and its money value. There may be a totalizing register for the summation of a series of sales, but an important feature of the indicator is the display of figures corresponding to each individual sale of dispensed gasoline with a consequence that such indication should be set back to zero before each dispensing operation in order to display the correct amount for each particular sale.

The principal object of the present invention is to provide a control mechanism for the dispensing apparatus which while it does not positively compel the attendant to reset the indicator to zero before beginning a new dispensing operation, does for all practical purposes, insure that the attendant will so act at least when he is selling gasoline to a customer.

In the present apparatus the resetting device for the indicator is operated manually and independently of the operation of other parts of the apparatus. Thus it is possible for the attendant to neglect its operation and still dispense gasoline. But if he does neglect to reset the indicator after one dispensing operation, then immediately upon taking steps to start a second dispensing operation he will be warned by a signal that he has failed to reset and furthermore a shutter will close and conceal the face of the indicator, so that neither the attendant nor the customer will be able to see any quantity indication when the gasoline is dispensed.

An operation of the resetting device to return the indicator to zero will immediately open the closed shutter so that the attendant may then proceed intelligently with the dispensing operation.

On the other hand, if after one dispensing operation and before a new dispensing operation is started, the attendant does operate the reset, then upon starting the new dispensing operation no signal will be given and the shutter will remain open, and it is expected that this will be the normal operation of the apparatus.

Further features of the improvement and additional aspects of the invention will become apparent from the following detailed description and accompanying drawings in which, Fig. 1 is a front elevational view of the pump casing, the front panel being partly broken away to disclose some of the principal units of a complete apparatus. In this view the dial face shutter is in open position.

Fig. 4 is a view on larger scale at the upper end of the casing, with parts broken away, to show operating elements of the shutter mechanism.

Fig. 5 is a sectional top plan view on line 5—5 of Fig. 4, looking down in the direction of the arrows.

Figure 1:
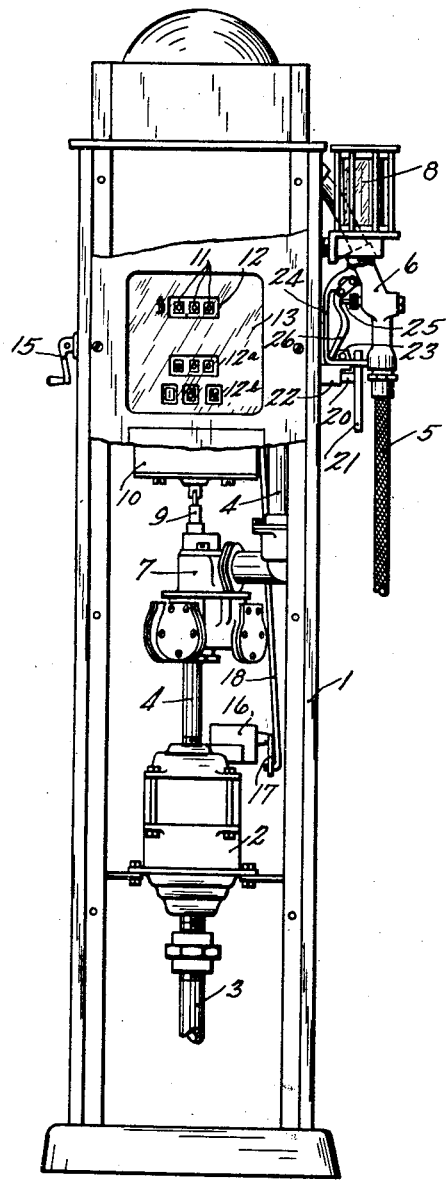
Figure 3:
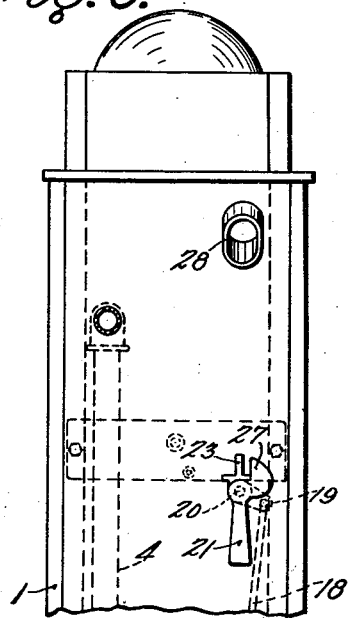
Fig. 3 is a partial view at the upper end of the casing at the hose supported side thereof.
Figure 2:
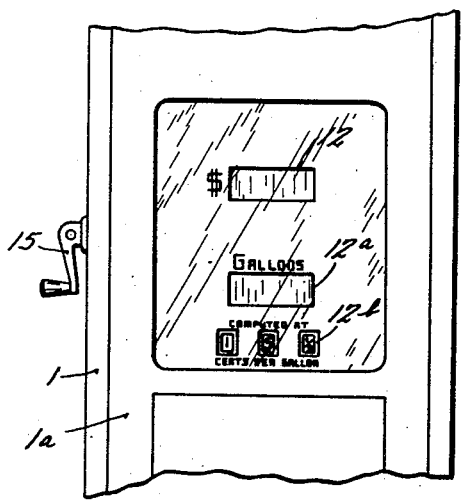
Fig. 2 is a partial view showing somewhat enlarged the dial face of the pump casing with the shutter in closed position.

Figs. 6 to 9 inclusive are detached views of the control mechanism showing the same in different positions.

Fig. 10 is a fragmentary detail view in front elevation showing a modified form of control mechanism.

Fig. 11 is a left hand end view of parts shown in Fig. 10.

Fig. 12 is a right hand end view of parts shown in Fig. 10.

Fig. 13 is a top view of the parts shown in Fig. 10.

Fig. 14 is a detail section along line 14—14 of Fig. 10, looking in the direction of the arrows.

Fig. 15 is a detail view similar to Fig. 13 showing a further modification of the control mechanism.

Fig. 16 is a sectional view along line 16—16 of Fig. 15.

Fig. 17 is a sectional view along line 17—17 of Fig. 15.

Except for the control mechanism and the shutter mechanism associated therewith, the dispensing apparatus is of standard and well known form. It comprises the pump casing 1 having mounted therein a combined electric motor and centrifugal pump unit 2 which draws gasoline through a suction line 3 from the reservoir tank (not shown) and forces said gasoline through a delivery line 4 for delivery through a flexible delivery hose 5 and nozzle 6. In the apparatus illustrated, the casing is formed with front and rear panels 1a and 1b, provided at the upper portions thereof with windows 1c, 1d for display of the register indication at each side of the apparatus.

Interposed in the delivery line 4 is a suitable meter 7 for quantitatively measuring the flow. this meter may be of the rotary valve type operated by the flow of liquid therethrough. Also interposed in said delivery line 4 is the usual visual flow indicator 8. Coupled by a shaft 9 for operation by the meter is the register indicator 10 for giving a visual indication of the amount of gasoline being dispensed in terms of gallons and dollars and cents, being known as the computer type. However, it is not essential that any particular type of register indicator be herein employed, and the invention contemplates the use of any well known type of indicator.

It will be understood that the indicator illustrated is of the conventional form now largely used with pumps of this character and comprises several sets of dial wheels having indicating figures 11 adapted to be exposed through sight openings 12, 12a, 12b, in a dial face plate 13 duplicated at each side of the casing. The indicator is provided with its usual resetting shaft 14 operated by crank 15 and it will be understood that this shaft 14 carries suitable elements for coaction with the mechanism of the indicator whereby one complete revolution of said shaft 14 in a counterclockwise direction will operate to reset the indicating dial wheels to initial or zero position and in this respect the shaft 14 and its appurtenances constitute what is herein termed as the resetting device. It is not deemed necessary to show in further detail the operating elements of the indicator and its resetting device since this mechanism is well known.

It should be remarked at this point that the conventional form of register indicator is usually provided with blinker shutter mechanism for the dial wheels, so connected to the resetting shaft that said blinker shutters are moved to cover the exposed figures of the dial wheels as soon as the reset shaft begins its operation and are moved to uncover said dial wheel figures when said reset shaft completes a revolution for resetting. This blinker shutter mechanism commonly associated with indicators of the type described is not herein illustrated as it forms no part of the present invention. If present as part of the conventional indicator it would operate in its usual manner entirely independent of the additional shutter mechanism about to be described, and which forms a feature of the present invention.

Preferably mounted as part of the combined motor and pump unit 2 is the switch box 16 containing within the same the usual switch (not shown) for closing and opening the electric motor circuit. 17 is the motor switch crank for operating said switch and is connected by link 18 to the switch handle crank 19 fixed to the switch handle shaft 20, said shaft being operable by the switch handle 21 for opening and closing the motor switch through the connections described. Extending from one side of the pump casing near the upper end thereof is a fixed nozzle support 22 having projecting upwardly therefrom the usual nozzle support lug 23. The nozzle 6 is provided with a nozzle guard 24 shaped to rest upon the nozzle support 22 and having a slot at its lower side for receiving therethrough the support lug 23 when the nozzle and guard rest upon the support 22. The purpose of the aperture in lug 23 is to receive a padlock for locking the nozzle on its support when the pump is not in use. The nozzle is also provided with the usual delivery valve (not shown) operable by plunger 25 and valve lever 26. The switch handle 21 is provided with a stop lug 27 whereby the nozzle and its guard 24 may not be properly placed on the support 22 when the switch handle is in its "on" position and coactively the switch handle 21 may not be operated to its "on" position when the nozzle and its guard 24 is properly placed on its support 22. A nozzle receptacle 28 at the upper end of the casing is provided for receiving the open end of the nozzle 6 when the latter is on its support 22.

The parts of the apparatus heretofore described are old and well known and the new features of construction will now be described.

Shutter mechanism

As shown more clearly in Figs. 4 and 5, a shutter in the form of a slidable rectangular plate 29 is mounted for vertical sliding movement between the dial wheels of the indicator 10 and the dial plate 13 of said indicator. This shutter 29 is guided in its vertical movement by non-friction elements 30 and 31 which may be provided on the posts connecting the dial face plate 13 to the indicator casing 10. The shutter 29 is formed with an aperture 32 of such shape and size as to expose the sight opening 12 and dial wheel figures therethrough when the shutter is in raised position as shown in Fig. 4. The lower edge of the shutter 29 is above and exposes the sight opening 12a when the shutter is in raised position. However, when the shutter 29 is in its lowermost position the aperture 32 is out of register with sight opening 12 and the shutter closes the latter; also in such position the lower edge of the shutter 29 will be below the sight opening 12a and thus this sight opening also will be covered by the shutter. The sight openings 12b which expose dial figures having a more or less permanent setting are not affected by the movements of said shutter 29.

An extension 33 from the upper end of the shutter is connected by pin and slot connection 36 to shutter lever 34, said lever being pivotally fulcrumed at 35 on the casing wall 1. As previously mentioned, the register indicator and the pump casing are arranged for a duplicate display of dial figures at the front and rear sides of said casing. Consequently the shutter 29 is duplicated at the rear side of the casing, and the shutter lever 34 is also duplicated by lever 34a as shown in Fig. 5. A cross tie rod 34b connects the two shutter levers 34 and 34a so as to provide a simultaneous operation of the duplicate shutters. A shutter link 37 is pivotally connected at one end 37a to the cross rod 34b of said shutter levers 34 and 34a, and at its other end 37b, to an extension 38c of a pivoted dog 38 of the control mechanism (see Figs. 6 to 9 inclusive).

Control mechanism

Referring more particularly to Figs. 6 to 9 inclusive, the control mechanism for operating the shutter mechanism will now be described. A pivoted dog 38 is mounted on pivot stud 39 extending from a bracket 48, the latter being fastened in a suitable position to the pump casing as illustrated in Fig. 4. The pivot stud 39 also furnishes a pivotal bearing for a toggle arm 40, the latter comprising parallel plates for straddling dog 38, and for carrying between them the rolls 41, 42 and 43. A toggle thrust rod 44, has a bifurcated end 45 to pivotally embrace pivot pin 46 on the toggle arm 40, and also has an upper end extending slidably through a slotted and rocking pivot stud 47, the latter being mounted in the bracket 48. A thrust rod spring 49 surrounds said rod, and bears at one end against a shoulder of the bifurcated portion 45 of said thrust rod and at its other end against said rocking pivot stud 47.

The spring 49 tends to throw the toggle comprising the rod 44 and arm 40 into either one of two cocked positions. The position of the cocked toggle at the right as shown in Fig. 6 is termed the first cocked position and the position of the cocked toggle at the left as shown in Fig. 7 is termed the second cocked position.

In the first cocked position of the toggle illustrated in Figs. 6 and 9 the roll 41 bears down on shoulder 38a of dog 38 and rocks or tends to rock the dog 38 clockwise for closing the shutter. In the second cocked position illustrated in Figs. 7 and 8, the roll 43 bears down on shoulder 38b of the dog 38 and rocks or tends to rock the dog counterclockwise for opening said shutter.

Affixedly mounted on or coupled to the reset shaft 14 is a cam carrier 50 having located at one portion thereof as shown a cam 51 and at another portion a reset notch 52. For coaction with the reset notch 52 is a tooth 53 on the dog 38. Affixedly mounted on the switch handle shaft 20 is a cam and pawl carrier 54 having at one portion thereof a shutter closing low-cam 55 and at an adjacent portion thereof a shutter opening high-cam 56. Also carried on the member 54 is a pawl 57 pivoted at 58 within a shoulder forming pocket of said cam carrier so that said pawl may swing to a limited degree outwardly from or inwardly into said pocket on different operations of said switch handle. When the switch handle is on, as in Figs. 8 and 9, the weight of the pawl swings it outwardly, and when the switch handle is off as in Figs. 6 and 7, the pawl falls into its pocket. The dog 38 has a roller 38d at one end thereof for riding upon the cam portions 55 and 56 of said cam carrier 54. Stops 59 are fixed to the bracket 48 and stops 60 are fixed to the switch handle shaft 20 for limiting the movement of the switch handle and its shaft 20 between on and off positions. The toggle is thrown from its first cocked position into its second cocked position by a rotation of the reset shaft 14, which carries cam 51 against the rolls 42 and 41 of the toggle. It is thrown from its second cocked position to its first cocked position by the turning "off" of the switch handle 21 which carries pawl 57 in working engagement against roll 43. In turning the switch handle to "on" position the pawl 57 rides idly by the roll 43.

A circuit switch 61 for a signaling device may be mounted upon the bracket 48 adjacent the extended end 38c of the dog 38 whereby when this end of the dog is up (to open the shutter) the switch 61 will be open, but when this end of the dog is down (to close the shutter) as in Fig. 9, it closes switch 61 for giving a signal. The electric circuit 62 for the switch 61 extends to a suitable electrically operated signal bell 63 which may be mounted at any convenient place on the pump casing. It will be understood that the signal switch 61, circuit 62 and bell 63 are herein shown diagrammatically, and that in a commercial apparatus, the signal switch will be enclosed in a protective box similar to the motor switch box 16, and that protected circuit wires for the signal bell will likewise be provided.

Operation

The operation of the shutter mechanism by the control mechanism is as follows:

At the end of a dispensing operation with the motor switch and switch handle "off" the parts are in the position shown in Fig. 6. As herein shown the cocking device or toggle is cocked to the right or first cocked position. Roll 41 presses down on shoulder 38a of the dog 38 tending to move the shutter link 37 down for closed shutter position. However the end 38d of the dog 38 bears against the high-cam 56 due to the switch handle 21 being in "off" position and this prevents closing of the shutter. At the same time the dog tooth 53 is held out of the reset notch 52 and the reset shaft 14 is free to operate. Presumably the indicator dials, moved by the last dispensing operation, still disclose the figures thereof and should be reset to zero before the next dispensing operation.

In this condition, if the attendant fails to operate the resetting device, and proceeds to turn on the switch handle 21, the parts will take the position shown in Fig. 9. This brings the low-cam 55 opposite the left end 38d of the dog 38 and permits the right end 38c to swing down under the force of the spring toggle or released cocking device and close the shutter 29. At this time also the right end 38c will close the switch 61 for ringing the signal bell 63.

The attendant will thus be warned that he has failed to reset the indicator. He will also be warned that the shutter 29 is closed and that he will not be able to read from the indicator any amount of gasoline dispensed under such conditions. Consequently the attendant will be sufficiently induced to operate the resetting device before proceeding further with the dispensing operation as by opening the nozzle valve.

The operation of the reset, viz. rotating shaft 14, counterclockwise will cause cam 51 to engage rolls 42, 41, and throw the toggle to the left or second cocked position, and the parts will take the position shown in Fig. 8. In this position under the force of the toggle spring 49, roll 43 presses against shoulder 38b of the dog 38 and holds the right end 38c of the dog 38 up with the shutter and the signal circuit both open. At the same time dog tooth 53 engages in the reset notch 52 to check further rotation of the resetting shaft 14. Under these conditions the attendant may properly proceed with the dispensing operation, and during this period with the motor switch "on" the attendant cannot inadvertently rotate the resetting shaft further. However, even in this condition the resetting shaft is not positively locked against rotation, the dog tooth 53 and reset notch 52 being so designed as to ride out of interengagement under sufficient force of turning the resetting shaft. The purpose of the reset lock by tooth 53 and notch 52 is to prevent inadvertent operation of the resetting device during the period that the apparatus is delivering gasoline.

It will be observed that the reset shaft automatically locks itself after each resetting operation, whether the switch handle is on or off. If the indicator has not been reset the reset shaft may be operated at least one revolution to reset irrespective of whether the switch handle is on or off, and after this one operation the reset is weakly locked as aforesaid against an inadvertent attempt to further reset, and this condition will continue after the switch handle is turned from off to on, thus making the reset weakly locked with the switch handle on. However when the switch handle is on and the right hand end of the dog is down to give the signal and close the shutter, the reset is completely unlocked because at this time it should be free for the operation of resetting.

At the end of a dispensing operation, the switch handle is turned back to off position and during this movement pawl 57 will engage roll 43 and throw the toggle to the right, its first cocked position. This will restore the parts to the position shown in Fig. 6, ready for a new operation.

The proper procedure for a dispensing operation starting with the parts in the position of Fig. 6, is to first operate the resetting shaft to reset the indicator, which brings the parts to the position shown in Fig. 7. This action cocks the toggle to its second cocked position and the parts in Fig. 7 are as described for Fig. 8, except that in Fig. 7 the switch handle 21 has not yet been turned "on". The shutter will be kept open and no signal given with the parts in this position and the switch handle can be turned on to the position of Fig. 8 without affecting said parts. Thus by proper procedure for a new dispensing operation, viz. first resetting and then turning on the switch handle, the shutter remains open and no signal is given, whereas the improper procedure, viz. turning on the switch handle, without prior resetting, causes a signal and a closed shutter.

It will be noted that after an improper or false start as illustrated in Fig. 9, viz. first turning on the switch handle instead of first resetting, the signal can be canceled, and the closed shutter opened by immediately turning the switch handle "off" as illustrated in Fig. 6. However, each time a false start is made, the signal occurs and the shutter closes, and the only way to prevent this is to proceed properly, viz. by first resetting and then turning on the switch handle.

In some cases it may be found desirable to control the operation of the shutter mechanism by the action of removing and replacing the nozzle on its support, leaving the switch handle free to operate without affecting said shutter mechanism. For this form of operation the modification shown in Figs. 10 to 14 inclusive is provided.

Referring to said figures, the bracket 48' is slightly changed in shape from the bracket 48 so as to accommodate the modified mechanism. As shown in Fig. 10, the switch handle shaft 20 is mounted in a suitable bearing in bracket 48' for its limited rotary movement in turning the motor switch on and off. Fixed to the outer end of said shaft 20 is the switch handle 21 and its stop lug 27' (see Fig. 12). At the inner end of said shaft 20 is fixed the crank 19 connected to the motor switch link 18 as before described.

The nozzle support 22' as shown in Fig. 12, is at one side of the shaft 20 and its bearing, so as to provide below said nozzle support a housing 64 for a nozzle plunger 65, and plunger lever 66, the latter being fulcrumed between its ends at 67 upon the bottom of the housing 64. The plunger 65 is mounted for easy sliding movement in a vertical guide hole through the support 22', the lower end of said plunger resting against the short arm of lever 66 and the upper end of said plunger adapted to protrude above the top of said nozzle support 22' when the plunger is in up position. A weight 68 may be provided for lever 66 as shown, tending to hold its short arm and the plunger 65 up. When the nozzle guard 24 is on its support 22' the lower side of said guard will bear on the plunger 65 and the weight of the nozzle will be sufficient to hold the plunger 65 down in the position shown in Fig. 10 wherein the lever 66 has been rocked from its dotted line position to its full line position.

Loosely mounted for a rocking rotation on the shaft 20 is a sleeve 54' constituting a cam and pawl carrier such as previously described. In other words as shown in Figs. 11 and 14, the sleeve 54' carries at its peripheral surface, the shutter closing low-cam 55 and shutter closing high-cam 56, also the pivoted pawl 57. The relation and coaction of these parts with the left end 38d of dog 38 is precisely the same as described in connection with Figs. 6 to 9 inclusive, except that in this modification the sleeve 54' is not operated by the switch handle, but by the connections about to be described. Adjacent and fastened to sleeve 54' is the collar 69 also loose on shaft 20, and said collar 69 has a projecting crank 70 connected by link 71 to the long arm of lever 66.

From the foregoing description it will be appreciated that in this modification, the placing of the nozzle on its support after a dispensing operation, will cock the toggle to its right or first cocking position as illustrated in Fig. 6 and that subsequent removal of the nozzle from its support, without a prior resetting operation, will give the signal and close the shutter as illustrated in Fig. 9. It will be understood also that the resetting shaft and its cam carrier for coaction with the toggle and dog 38 to nullify the signal and shutter closing means is the same as previously described and need not be repeated for this modification.

A still further modification is illustrated in Figs. 15, 16 and 17 wherein the cam and pawl carrier is divided into two parts, one of the parts carrying the high and low cam, and connected for operation by the nozzle plunger of Fig. 10, the other part carrying the pawl and connected to the switch handle shaft 20 for operation by the switch handle 21 of Fig. 10.

Referring to Fig. 15, the cam carrier is a sleeve 72 loosely mounted on shaft 20 and having fastened at one side thereof the collar 69 also loose on shaft 20, said collar 69 having its crank 70 connected by link 71 to the lever 66 of the mechanism shown in Fig. 10 and operated similarly thereto.

The pawl carrier is a sleeve 73 adjacent to but separate from sleeve 72 and sleeve 73 is fastened to the shaft 20 for operation thereby. The sleeve 73 carries the pawl 54 acting to throw the toggle to its right hand cocked position when the switch handle is turned off similarly to the operation in Fig. 6. As shown in Fig. 15, the roll end 38x of the dog 38 extends laterally past the pawl carrier 73 to engage the cams on carrier 72, and as shown in Figs. 16 and 17, the pawl carrier 73 is smaller in diameter than carrier 72 so as not to interfere with roll end 38x.

In this second modification, the turning off of switch handle 21 will cock the toggle in position tending when released to close the shutter and give the signal. If under such conditions the attendant lifts the nozzle off its support without previously resetting the indicator then the signal will be given and the shutter closed. A resetting operation before lifting off the nozzle will prevent the signal and closed shutter, occurring upon the subsequent lifting off of the nozzle, and after a signal has been given and the shutter closed, a resetting operation will cancel the signal and open the shutter, all in a manner similar to that described in the other forms of the apparatus.

I claim:

1. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of said manual member to "on" position serving to cause a closing action of said shutter mechanism, and means actuated by the operation of said resetting device prior to the "on" movement of said manual member, serving to prevent any movement of said shutter mechanism being caused by the subsequent movement of said manual member to "on" position.

2. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of said manual member to "off" position serving to open a previously closed shutter mechanism, and means actuated by the movement of said manual member to "on" position serving to cause a closing action of said shutter mechanism.

3. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of said manual member to "off" position serving to open a previously closed shutter mechanism, means actuated by the movement of said manual member to "on" position serving to cause a closing action of said shutter mechanism, and means actuated by the operation of said resetting device prior to the "on" movement of said manual member, serving to prevent any movement of said shutter mechanism being caused by the subsequent movement of said manual member to "on" position.

4. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of said manual member to "off" position serving to open a previously closed shutter mechanism, means actuated by the movement of said manual member to "on" position serving to cause a closing action of said shutter mechanism, and means actuated by the operation of said resetting device to open a previously closed shutter mechanism.

5. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of said manual member to "on" position serving to cause a closing action of said shutter mechanism, means actuated by the operation of said resetting device prior to the "on" movement of said manual member, serving to prevent any movement of said shutter mechanism being caused by the subsequent movement of said manual member to "on" position, and a check stop for the resetting device rendered active after each complete operation of said resetting device.

6. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of said manual member to "off" position serving to open a previously closed shutter mechanism, means actuated by the movement of said manual member to "on" position serving to cause a closing action of said shutter mechanism, means actuated by the operation of said resetting device prior to the "on" movement of said manual member, serving to prevent any movement of said shutter mechanism being caused by the subsequent movement of said manual member to "on" position, and a check stop for the resetting device rendered active after each complete operation of said resetting device.

7. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of said manual member to "on" position serving to cause a closing action of said shutter mechanism, means actuated by the operation of said resetting device prior to the "on" movement of said manual member, serving to prevent any movement of said shutter mechanism being caused by the subsequent movement of said manual member to "on" position, a check stop for the resetting device rendered active after each complete operation of said resetting device, and means operated by the movement of the manual member to its "off" position serving to render said check stop inactive.

8. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of said manual member to "off" position serving to open a previously closed shutter mechanism, means actuated by the movement of said manual member to "on" position serving to cause a closing action of said shutter mechanism, means actuated by the operation of said resetting device prior to the "on" movement of said manual member, serving to prevent any movement of said shutter mechanism being caused by the subsequent movement of said manual member to "on" position, a check stop for the resetting device rendered active after each complete operation of said resetting device, and means operated by the movement of the manual member to its "off" position serving to render said check stop inactive.

9. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of said manual member to "on" position serving to cause a closing action of said shutter mechanism, means actuated by the operation of said resetting device to open a previously closed shutter mechanism, and a check stop for the resetting device rendered active after each complete operation of said resetting device.

10. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of said manual member to "on" position serving to cause a closing action of said shutter mechanism, means actuated by the operation of said resetting device to open a previously closed shutter mechanism, a check stop for the resetting device rendered active after each complete operation of said resetting device, and means operated by the movement of the manual member to its "off" position serving to render said check stop inactive.

11. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of said manual member to "off" position serving to open a previously closed shutter mechanism, means actuated by the movement of said manual member to "on" position serving to cause a closing action of said shutter mechanism, means actuated by the operation of said resetting device to open a previously closed shutter mechanism, and a check stop for the resetting device rendered active after each complete operation of said resetting device.

12. In a liquid dispensing apparatus in combination, flow establishing means, a manually moved member having an "on" position corresponding to a dispensing operation and an "off" position corresponding to a non-dispensing condition, a meter for measurig the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of said manual member to "off" position serving to open a previously closed shutter mechanism, means actuated by the movement of said manual member to "on" position serving to cause a closing action of said shutter mechanism, means actuated by the operation of said resetting device to open a previously closed shutter mechanism, a check stop for the resetting device rendered active after each complete operation of said resetting device, said check stop being rendered inactive by the movement of the manual member to off position.

13. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to resist said indicator to initial position after each dispensing operation, shutter mechanism for said indicator having a closing action for concealing said indicator and an opening action for revealing said indicator, a cocking device acting when released from a cocked position to close said shutter mechanism, means actuated by the movement of said manual member to "off" position serving to cock said cocking device, and means actuated by the movement of said manual member to "on" position serving to release said cocked device for closing the shutter mechanism.

14. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, a cocking device acting when released from a cocked position to close said shutter mechanism, means actuated by the movement of said manual member to "off" position serving to cock said cocking device, means actuated by the movement of said manual member to "on" position serving to release said cocked device for closing the shutter mechanism, and means actuated by a subsequent movement of said manual member to "off" position to open said shutter mechanism.

15. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, a cocking device acting when released from a cocked position to close said shutter mechanism, means actuated by the movement of said manual member to "off" position serving to cock said cocking device, means actuated by the movement of said manual member to "on" position serving to release said cocked device for closing the shutter mechanism, and means actuated by the operation of said resetting device to render said cocking device inoperative toward closing said shutter mechanism.

16. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, a cocking device having a first cocked position and a second cocked position, said cocking device in its first cocked position acting upon release to close said shutter mechanism and acting in its second cocked position to open said shutter mechanism, means actuated by the movement of said manual member to "off" position serving to shift said cocking device from its second cocked position to its first cocked position, and means actuated by the operation of said reset device serving to shift said cocking device from its first cocked position to its second cocked position.

17. In a liquid dispensing apparatus in combination, flow establishing means, a manually moved member having an "on" position corresponding to a dispensing operation, and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, a cocking device having a first cocked position and a second cocked position, said cocking device in its first cocked position acting upon release to close said shutter mechanism and acting in its second cocked position to open said shutter mechanism, means actuated by the movement of said manual member to "off" position serving to shift said cocking device from its second cocked position to its first cocked position, means actuated by the movement of said manual member to "on" position serving to release said cocked device for closing the shutter mechanism, and means actuated by the operation of said reset device serving to shift said cocking device from its first cocked position to its second cocked position.

18. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, a cocking device having a first cocked position and a second cocked position, said cocking device in its first cocked position acting upon release to close said shutter mechanism and acting in its second cocked position to open said shutter mechanism, means actuated by the movement of said manual member to "off" position serving to shift said cocking device from its second cocked position to its first cocked position, means actuated by the movement of said manual member to "off" position serving to restrain said cocked device from closing said shutter mechanism, means actuated by the movement of said manual member to "on" position serving to release said cocked device for closing the shutter mechanism, and means actuated by the operation of said reset device serving to shift said cocking device from its first cocked position to its second cocked position.

19. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, a cocking device acting when released from a cocked position to close said shutter mechanism, means actuated by the movement of said manual member to "off" position serving to cock said cocking device, means actuated by the movement of said manual member to "on" position serving to release said cocked device for closing the shutter mechanism, means actuated by the operation of said resetting device to render said cocking device inoperative toward closing said shutter mechanism, a check stop for the resetting device rendered active after each complete operation of said resetting device, said check stop being rendered inactive by the movement of the manual member to "off" position.

20. In a liquid dispensing apparatus in combination, flow establishing means, a manually moved member having an "on" position corresponding to a dispensing operation and an "off" position corresponding to a non-dispensing condition, a second manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, means actuated by the movement of one of said manual members to "on" position serving to cause a closing action of said shutter mechanism, and means actuated by the operation of said resetting device prior to the "on" movement of said manual member, serving to prevent the closing action of said shutter mechanism taking place upon the subsequent movement of said manual member to "on" position.

21. In a liquid dispensing apparatus in combination, flow establishing means, a manually moved member having an "on" position corresponding to a dispensing operation and an "off" position corresponding to a non-dispensing condition, a second manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, shutter mechanism for said indicator having a closing action for concealing said indicator and an opening action for revealing said indicator, a cocking device acting when released from a cocked position to close said shutter mechanism, means actuated by the movement of one of said manual members to "off" position serving to cock said cocking device, and means actuated by the movement of one of said manual members to "on" position serving to release said cocked device for closing the shutter mechanism.

22. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, a signalling device, means to give a signal actuated by the movement of said manual member to "on" position, and means to prevent the giving of said signal actuated by the operation of said resetting device prior to "on" movement of said manual member, said preventing means also acting to cancel a previously given signal upon operation of the resetting device subsequently to the "on" movement of said manual member.

23. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, a signalling device, means to give a signal actuated by the movement of said manual member to "on" position, means to cancel said signal actuated by the movement of said manual member to "off" position, and means to prevent the giving of said signal actuated by the operation of said resetting device prior to "on" movement of said manual member.

24. In a liquid dispensing apparatus in combination, flow establishing means, a manually moved member having an "on" position corresponding to a dispensing operation and an "off" position corresponding to a non-dispensing condition, a meter for measuring the dispensed flow, an indicator operated from said meter for indicating the measured flow, a resetting device operable to reset said indicator to initial position after each dispensing operation, a signaling device, means to give a signal actuated by the movement of said manual member to "on" position only in the absence of having previously operated said resetting device, and means to cancel said given signal by operating said resetting device.

25. Control mechanism for the flow in liquid dispensing apparatus of the type having a register indicator for the quantity of liquid dispensed, and manually operative reset mechanism to restore said indicator to zero after a dispensing operation, said control mechanism comprising a manual member movable to "on" and "off" positions corresponding to dispensing and non-dispensing conditions, a shutter for said indicator having open and closed positions, selectively operated connections between said manual member and said shutter whereby said manual member in moving to "on" position before a reset operation acts to close said shutter, and in moving to "on" position after a reset operation fails to close said shutter, and means actuated by the operation of said reset mechanism to open said closed shutter.

26. Control mechanism for the flow in liquid dispensing apparatus of the type having a register indicator for the quantity of liquid dispensed, and manually operative reset mechanism to restore said indicator to zero after a dispensing operation, said control mechanism comprising a manual member movable to "on" and "off" positions corresponding to dispensing and non-dispensing conditions, a shutter for said indicator having open and closed positions, selectively operated connections between said manual member and said shutter whereby said manual member in moving to "on" position before a reset operation acts to close said shutter, and in moving to "on" position after a reset operation leaves said shutter unmoved in open position.

27. Control mechanism for the flow in liquid dispensing apparatus of the type having a register indicator for the quantity of liquid dispensed and manually operative reset mechanism to restore said indicator to zero after a dispensing operation, said control mechanism comprising a manual member movable to "on" and "off" positions corresponding to dispensing and non-dispensing conditions, a shutter for said indicator having open and closed positions, selectively operated connections between said manual member and said shutter whereby said manual member, in moving to "on" position before a reset operation, acts to close said shutter, and means whereby the operation of said reset mechanism, before moving said manual member to "on" position, renders the connection between said manual member and said shutter inoperative.

28. An automatically operated signal for a liquid dispenser having a switch-controlled motor-driven pump and a meter-operated resettable indicator operatively related therewith, and mechanism having connection with said indicator and said signal so arranged that said signal is actuated only upon operation of the dispenser without first resetting of said indicator.

29. A liquid dispenser having a liquid supply means, a meter-driven resettable indicator operably associated with said means, a movable dispensing member for delivering liquid from the dispenser, means engageable by said dispensing member provided with a connection for controlling said supply means, and a signal incorporated in said dispenser, said signal having actuating mechanism operably associated with said supply means, indicator and dispensing member so arranged that the signal is operated only when the dispensing operation is commenced without the indicator having been first reset.

30. Liquid dispensing apparatus having operating means therefor including a resettable indicator, a signal and a controlling mechanism for said signal that is operatively associated with the reset mechanism of said indicator so arranged that said signal is actuated upon operation of the dispenser only when the dispensing operation is commenced without the indicator having been first reset.

CHESTER T. NEAL.